United States Patent

Satomura

(10) Patent No.: US 9,465,352 B2
(45) Date of Patent: Oct. 11, 2016

(54) DEVELOPER CONTAINER, DEVELOPING DEVICE, PROCESS CARTRIDGE, METHOD FOR FORMING DEVELOPER CONTAINER, METHOD FOR FORMING DEVELOPING DEVICE, AND METHOD FOR FORMING PROCESS CARTRIDGE

(71) Applicant: CANON KABUSHIKI KAISHA, Tokyo (JP)

(72) Inventor: Shogo Satomura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/047,356

(22) Filed: Feb. 18, 2016

(65) Prior Publication Data

US 2016/0246251 A1 Aug. 25, 2016

(30) Foreign Application Priority Data

Feb. 23, 2015 (JP) ................................ 2015-032454

(51) Int. Cl.

| G03G 15/08 | (2006.01) |
| G03G 21/16 | (2006.01) |
| G03G 21/18 | (2006.01) |
| B29C 45/16 | (2006.01) |
| B29K 25/00 | (2006.01) |
| B29K 23/00 | (2006.01) |
| B29K 105/16 | (2006.01) |
| B29K 507/04 | (2006.01) |
| B29L 31/00 | (2006.01) |

(52) U.S. Cl.
CPC ....... *G03G 21/1676* (2013.01); *B29C 45/1615* (2013.01); *G03G 21/181* (2013.01); *B29K 2023/083* (2013.01); *B29K 2025/06* (2013.01); *B29K 2105/16* (2013.01); *B29K 2507/04* (2013.01); *B29K 2995/0005* (2013.01); *B29L 2031/712* (2013.01)

(58) Field of Classification Search
USPC ............ 399/9, 24, 25, 27–30, 107, 110, 111, 399/119, 120
See application file for complete search history.

(56) References Cited

U.S. PATENT DOCUMENTS

| 6,282,384 B1 * | 8/2001 | Saito ................... G03G 21/1814 399/27 |
| 6,512,895 B2 * | 1/2003 | Sakurai ............. G03G 21/1814 399/111 |
| 6,587,650 B2 * | 7/2003 | Yokoi ................ G03G 15/0896 399/27 |
| 6,859,627 B2 * | 2/2005 | Karakama .......... G03G 21/1867 399/27 |

FOREIGN PATENT DOCUMENTS

| JP | 2005-121762 A | 5/2005 |
| JP | 2014-63200 A | 4/2014 |

* cited by examiner

*Primary Examiner* — Hoan Tran
(74) *Attorney, Agent, or Firm* — Canon USA, Inc. I.P. Division

(57) ABSTRACT

A developer container includes a frame configured to store developer, a conductive member provided on the frame, and a conductive contact member formed of resin on an outer side of the frame so as to be in contact with a part of the conductive member that is exposed from the frame to establish conduction. The contact member includes a protruding portion that is disposed at a portion to be in contact with the conductive member and protrudes toward the conductive member. The conductive member includes an engaging portion that is formed to fit with the protruding portion and configured to engage with the protruding portion. As a result, stable conductivity is secured by simplifying the configuration of the contact member for electrically connecting the conductive member provided on the frame, to an image forming apparatus main body.

20 Claims, 9 Drawing Sheets

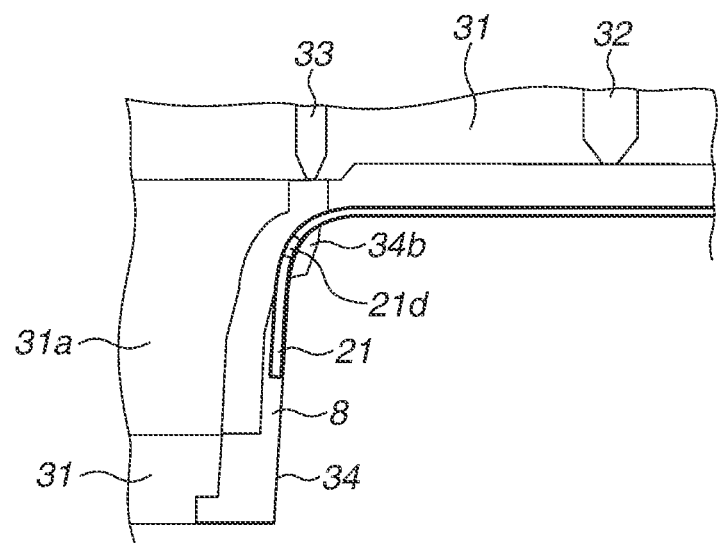
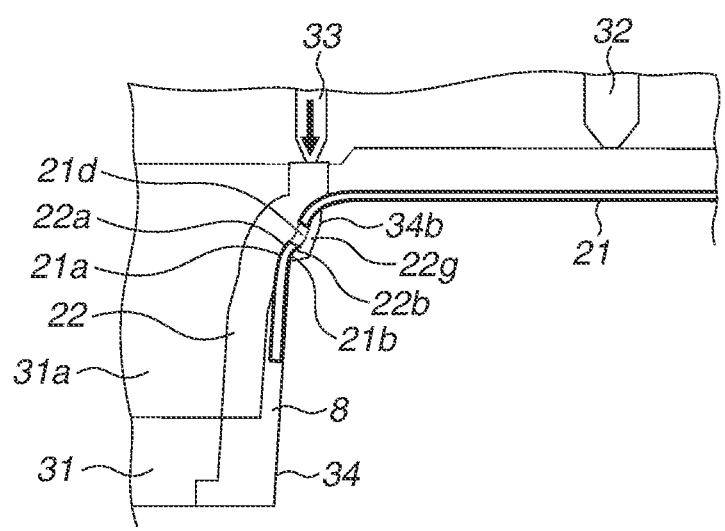

DEVELOPER CONTAINER, DEVELOPING DEVICE, PROCESS CARTRIDGE, METHOD FOR FORMING DEVELOPER CONTAINER, METHOD FOR FORMING DEVELOPING DEVICE, AND METHOD FOR FORMING PROCESS CARTRIDGE

BACKGROUND OF THE INVENTION

1. Field of the Invention

The present invention relates to a developer container, a developing device, a process cartridge, a method for forming the developer container, a method for forming the developing device, and a method for forming the process cartridge.

Herein, the term developer container refers to a container for storing developer, and refers to a container for storing developer to be used in an image forming apparatus, or waste developer remaining after being used for developing.

The term developing device refers to a developing device that at least includes a developer container and a developer bearing member, and visualizes an electrostatic latent image with developer.

The term process cartridge refers to a cartridge that at least includes a developer container, a developer bearing member, and an image bearing member in an integrated manner, and is configured to be detachably attached to an image forming apparatus main body.

2. Description of the Related Art

Conventionally, an electrophotographic image forming apparatus using an electrophotographic image forming process has been employing a process cartridge system. More specifically, an electrophotographic photosensitive member and a process unit that acts on the electrophotographic photosensitive member are integrally formed into a unit in the form of a cartridge configured to be detachably attached to an image forming apparatus main body.

In such a process cartridge, a cartridge frame and a component that constitute the process cartridge are provided with various thin plate-shaped conductive members to be used for a certain purpose. The conductive members are fixed to the frame and the component by a certain method. When electrical connection needs to be established with the image forming apparatus main body, the frame and the component are each provided with a connection member for electrically connecting to the image forming apparatus main body in such a manner that the connection member is in contact with the conductive member.

For example, Japanese Patent Application Laid-Open No. 2005-121762 discusses a technique for detecting a developer amount in a developer container by measuring electrostatic capacitance. In Japanese Patent Application Laid-Open No. 2005-121762, an electrode rod for fixing a thin metal plate member to a cartridge frame to electrically connect the thin metal plate member to the image forming apparatus main body is provided in such a manner that the electrode rod penetrates through the frame. A through hole through which the electrode rod penetrates is provided with a sealing member to prevent developer from leaking out of the frame.

In Japanese Patent Application Laid-Open No. 2014-63200, the electrical connection with the image forming apparatus main body is established in the following manner. A developing blade that is made of a metal plate and regulates the developer amount is fixed on a cartridge frame with a conductive fixing screw, and conductive resin is molded on the frame so as to be in contact with the fixing screw, thereby establishing the electrical connection with the image forming apparatus main body.

In the above conventional configurations, however, a plurality of components such as the electrode rod and the sealing member need to be additionally provided for forming a conductive path for electrically connecting the thin metal plate member serving as a conductive member, to the image forming apparatus main body. Thus, the configuration is complicated and requires an extra assembling process. Furthermore, a fixing member of some sort is required for fixing a power-supplied member to the cartridge frame, and thus a fixing process is further required.

SUMMARY OF THE INVENTION

The present invention is directed to a technique for securing stable conductivity by simplifying the configuration of a contact member that electrically connects between a conductive member provided on a frame and an image forming apparatus main body.

According to an aspect of the present invention, a developer container includes a frame configured to store developer, a conductive member provided on the frame, and a conductive contact member formed of resin on an outer side of the frame so as to be in contact with a part of the conductive member that is exposed from the frame to establish conduction. The contact member includes a protruding portion that is disposed at a portion to be in contact with the conductive member and protrudes toward the conductive member. The conductive member includes an engaging portion that is formed to fit with the protruding portion and configured to engage with the protruding portion.

Further features of the present invention will become apparent from the following description of exemplary embodiments with reference to the attached drawings.

BRIEF DESCRIPTION OF THE DRAWINGS

FIGS. 7A and 7B are schematic cross-sectional views illustrating a process for molding the contact member according to the first exemplary embodiment.

DESCRIPTION OF THE EMBODIMENTS

Exemplary embodiments of the present invention will be described in detail below with reference to the drawings. Sizes, material, shapes, and relative arrangements of components described in the following exemplary embodiments are to be changed as appropriate in accordance with a configuration and various conditions of an apparatus to which the present invention is applied, and are not to be construed as limiting the scope of the present invention.

A process cartridge including a developer container according to a first exemplary embodiment, and an image forming apparatus including the process cartridge configured to be detachably attached thereto will be described below with reference to the drawings. In the present exemplary embodiment, the description will be given of an antenna member serving as a remaining toner amount detection unit, as an example of a conductive member electrically connecting to an image forming apparatus main body.

[Schematic Configuration of Electrophotographic Image Forming Apparatus]

Figure 1A:
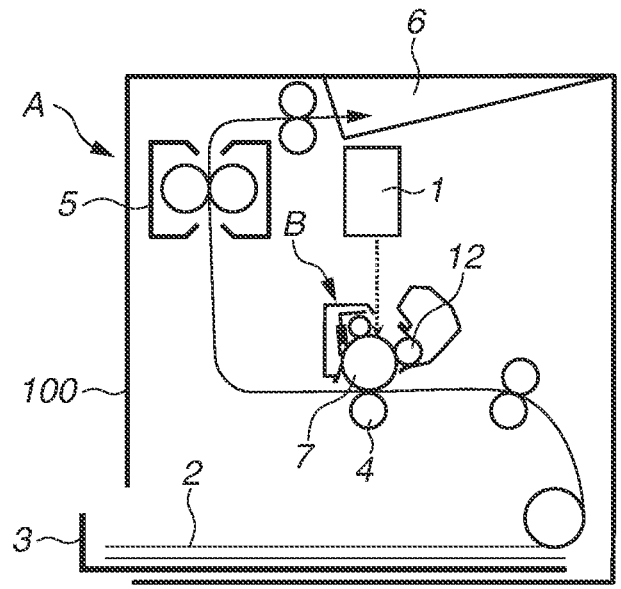
FIG. 1A is a schematic cross-sectional view illustrating an overall configuration of an image forming apparatus and FIG. 1B is a schematic cross-sectional view of a process cartridge.
Figure 1B:
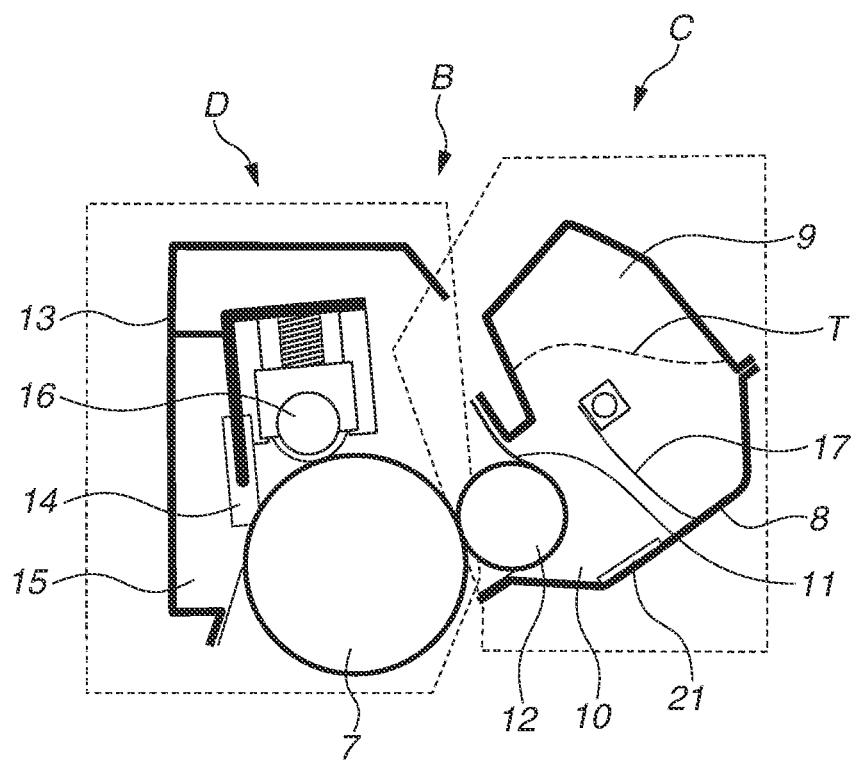

An overall configuration of an electrophotographic image forming apparatus will be described with reference to FIGS. 1A and 1B. FIG. 1A is a schematic cross-sectional view illustrating an overall configuration of an image forming apparatus to which a process cartridge including a developer component according to an exemplary embodiment of the present invention is attached. In the present exemplary embodiment, a monochrome color laser beam printer will be described as an example of the image forming apparatus. However, the present invention is not limited to this, and can be applied to other image forming apparatuses such as a full-color printer, a copier, a facsimile, and an inkjet printer.

As illustrated in FIG. 1A, in an electrophotographic image forming apparatus A, an optical device 1 emits information light (laser beam) that is based on image information, onto a photosensitive drum 7, which serves as an image bearing member (electrophotographic photosensitive drum). Then, a resultant latent image is developed with developer (hereinafter, referred to as toner), whereby a toner image is formed. Synchronously with the formation of the toner image, a recording material 2 is conveyed from a sheet cassette 3. Then, the toner image formed on the photosensitive drum 7 is transferred onto the recording material 2 by a transfer roller 4. After the transferred toner image is fixed on the recording material 2 by a fixing unit 5, the recording material 2 is discharged to a discharge unit 6.

[Schematic Configuration of Process Cartridge]

Next, a configuration of the process cartridge will be described with reference to FIGS. 1A and 1B. FIG. 1B is a schematic cross-sectional view for illustrating a schematic configuration of a process cartridge B according to the present exemplary embodiment.

The process cartridge B includes a developing unit C and a drum unit D that are coupled to each other in a relatively rotatable manner. The process cartridge B is configured to be detachably attached to an apparatus main body 100 of the electrophotographic image forming apparatus A. The developing unit C includes a developing roller (developer bearing member) 12, a development frame 8, and the like. The developing roller 12 is used for supplying toner T to the photosensitive drum 7 to develop a toner image (developer image). The development frame 8 stores the toner T and supports the developing roller 12 and the like. The drum unit D includes components such as the photosensitive drum 7, a cleaning blade 14, and the like, as well as a drum frame 13 that supports these components.

The toner T stored in a toner storage unit 9 of the developing unit C is sent to a developing chamber 10, so that a toner layer to which triboelectric charge is imparted by a developing blade 11 is formed on the surface of the developing roller 12. The toner on the surface of the developing roller 12 is then transferred onto the photosensitive drum 7 in accordance with the latent image, whereby the toner image is formed on the photosensitive drum 7. After the toner image on the photosensitive drum 7 is transferred onto the recording material 2 by the transfer roller 4, the cleaning blade 14 scrapes off the toner remaining on the photosensitive drum 7, and the remaining toner is collected (removed) into a waste toner storage unit 15. Then, the surface of the photosensitive drum 7 is uniformly charged by a charging roller 16 serving as a charging member (process unit) to enter a state where a latent image can be formed by the optical device 1.

The developing unit C includes a developer container or a developing device. More specifically, the developer container includes the development frame 8 for storing toner, as well as a conductive member and a contact member that are to be described later. In addition to the components described above, the developing device further includes the developing roller 12 for supplying the toner T to the photosensitive drum 7 to develop the toner image (developer image). In the present exemplary embodiment, a configuration example where the developing unit C includes the developer container or the developing device is described. Alternatively, the developer container and the developing device may each be independently provided.

[Toner Amount Detection Configuration]

Figure 2:
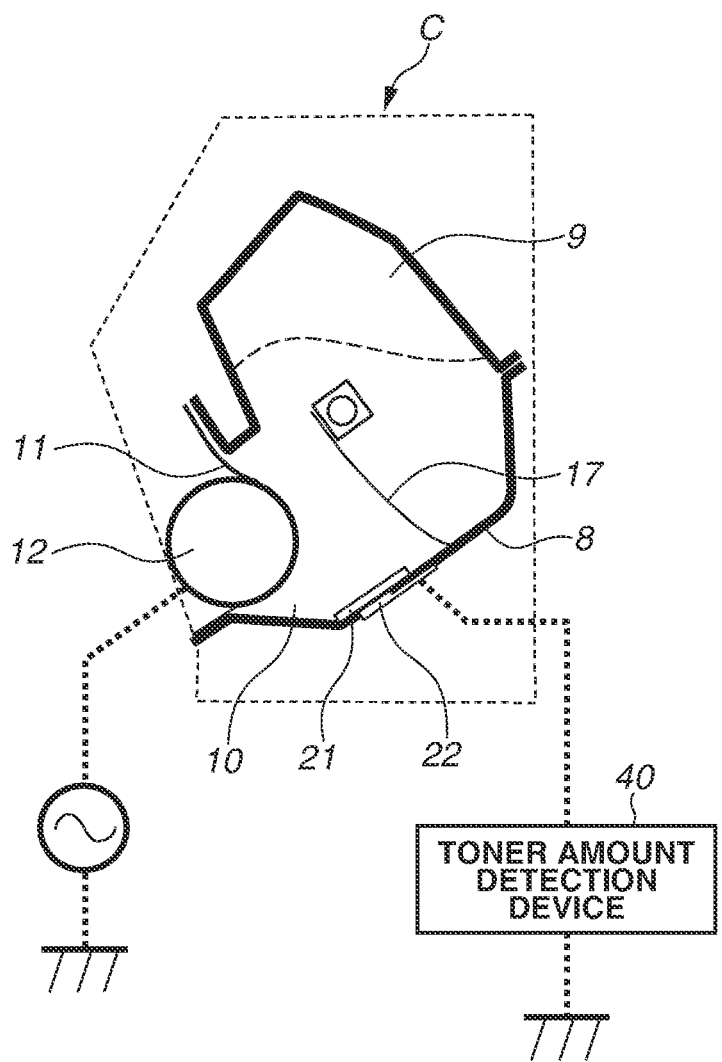
FIG. 2 is a schematic cross-sectional view of a developing unit of the process cartridge.

Next, a toner amount detection configuration according to the first exemplary embodiment will be described with reference to FIG. 2. FIG. 2 is a schematic cross-sectional view of the developing unit C according to the present exemplary embodiment.

In the present exemplary embodiment, as illustrated in FIG. 2, a method of measuring a remaining toner amount by measuring electrostatic capacitance between two conductive members is used as a toner remaining amount detection method, and a conductive antenna member 21 is provided as a detection member for detecting the electrostatic capacitance. When AC voltage is applied to the developing roller 12, current is induced between the developing roller 12 and the antenna member 21 that serve as the conductive members, according to the electrostatic capacitance therebetween. The electrostatic capacitance changes in accordance with the toner amount (developer amount) in the development frame 8, and the current induced according to the electrostatic capacitance is transmitted as a signal to a toner amount detection device 40 in the image forming apparatus A. The toner amount in the development frame 8 can be sequentially estimated (detected) by measuring the electrostatic capacitance indicated by the signal.

The antenna member 21 is a conductive member having conductivity and is one of the electrodes (conductive members) for measuring the electrostatic capacitance. The antenna member 21 is disposed at a position where the antenna member 21 can detect the electrostatic capacitance that changes in accordance with the change in the toner amount. A material of the antenna member 21 may be a metal plate such as a steel use stainless (SUS) plate, or may be a conductive resin sheet member or the like. One of the electrodes (conductive members) for measuring the electrostatic capacitance is not limited to the developing roller 12 as in the present exemplary embodiment, and may be another antenna member for measuring the electrostatic capacitance. In other words, a plurality of antenna members may be disposed.

If the antenna member is disposed close to the developing roller 12 as illustrated in FIG. 2, a small amount of remaining toner can be accurately detected. In contrast, if the antenna member is disposed far from the developing roller 12, a large amount of remaining toner can be accurately detected.

[Configuration of Conductive Path to Contact Point]

Next, a configuration of a conductive path according to the present exemplary embodiment will be described with reference to FIGS. 3A, 3B, and 3C. The conductive path connects between the contact member electrically connecting to the image forming apparatus main body 100, and the antenna member serving as a developer amount detection unit.

Figure 3A:
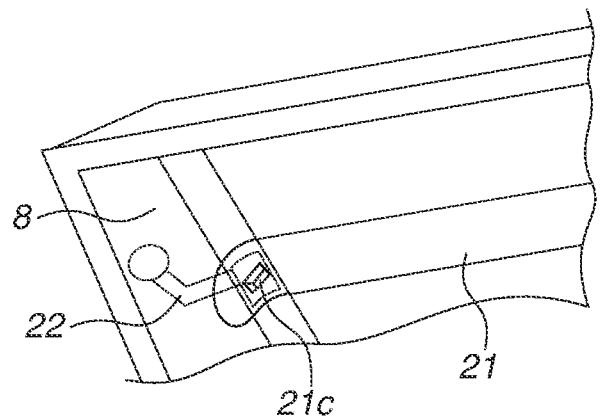
FIGS. 3A, 3B, and 3C are schematic explanatory views illustrating a configuration of a conductive path of a development frame of a developing unit according to a first exemplary embodiment.
Figure 3B:
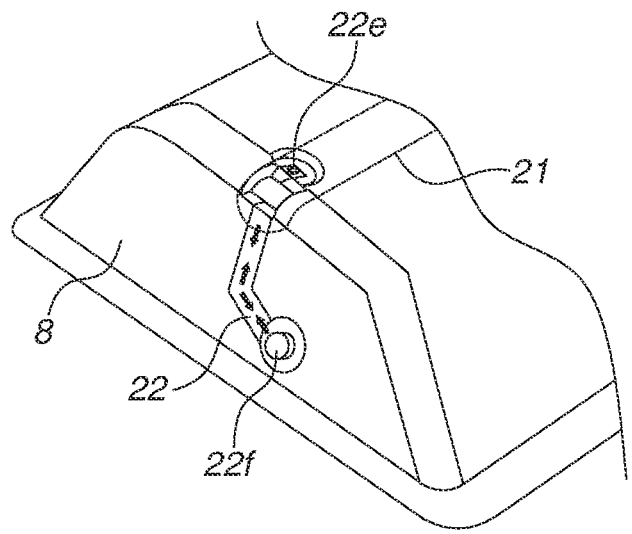
Figure 3C:
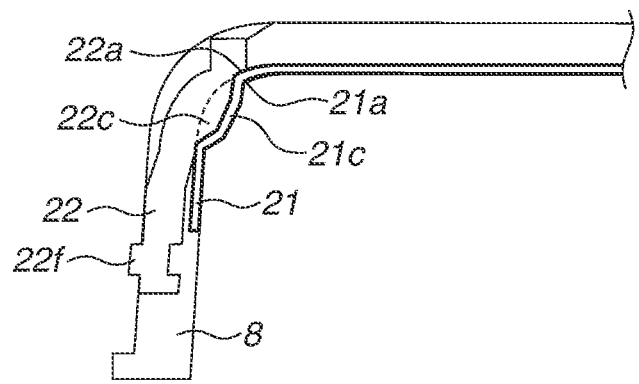

FIGS. 3A, 3B, and 3C are schematic views illustrating a configuration example of a contact member 22 electrically connecting between the antenna member 21 disposed on the development frame 8 and the image forming apparatus main body 100. FIG. 3A is a schematic perspective view of the development frame 8 as viewed from the inner side. FIG. 3B is a schematic perspective view of the development frame 8 as viewed from the outer side. FIG. 3C is a schematic cross-sectional view of a connection portion between the antenna member 21 on the development frame 8 and the contact member 22, as viewed in a shorter side direction of the development frame 8.

In the present exemplary embodiment, as illustrated in FIG. 3A, the antenna member 21 for detecting the remaining toner amount by measuring the electrostatic capacitance is integrally formed with the development frame 8 on the inner side thereof, through insert molding. The antenna member 21 serving as one conductive member is disposed along the longitudinal direction on the inner side of the development frame 8 in such a manner as to face the developing roller 12 serving as the other conductive member.

As illustrated in FIG. 3B, the contact member 22 for electrically connecting to the image forming apparatus main body 100 is integrally formed with the development frame 8 on the outer side thereof, through double color molding. As illustrated in FIG. 3C, the contact member 22 has a first contacting portion 22a that comes into contact with a first contacted portion 21a, which is a portion of the antenna member 21 that is exposed from the development frame 8, thereby establishing the electrical connection. The first contacting portion 22a of the contact member 22 includes a contact area in which a protruding portion 22c protruding toward the antenna member 21 is formed. Meanwhile, an engaging portion 21c is formed at a position in the antenna member 21 that corresponds to the protruding portion 22c of the contact member 22. The engaging portion 21c protrudes toward the inner side of the development frame 8 to fit with the protruding portion 22c.

The contact member 22 includes a contact portion 22f that is electrically connecting to a contact point (not illustrated) on the side of the image forming apparatus main body 100 directly or via a conductive member such as an electrode provided on a bearing or the like. Thus, the signal is transmitted to the toner amount detection device 40 provided in the image forming apparatus main body 100, whereby the toner amount is detected.

In the present exemplary embodiment, a case where a conductive resin sheet member is used as the antenna member 21 has been described as an example. For example, a sheet having conductivity due to carbon black dispersed in polystyrene resin (hereinafter, referred to as PS resin) or ethylene vinyl acetate (EVA) resin is used as the conductive resin sheet member.

[Method for Forming Conductive Path]

Figure 5A:
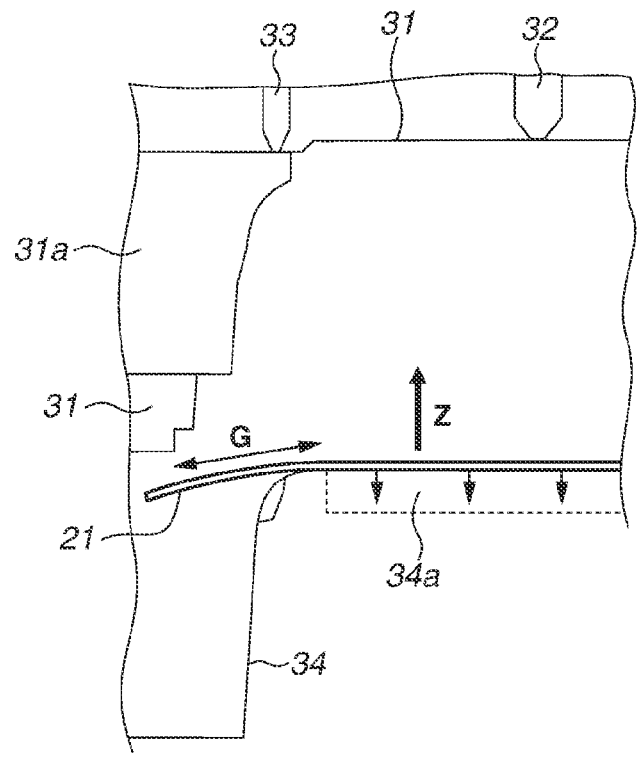
FIGS. 5A, 5B, and 5C are schematic cross-sectional views illustrating a process for molding the development frame according to the first exemplary embodiment.
Figure 5B:
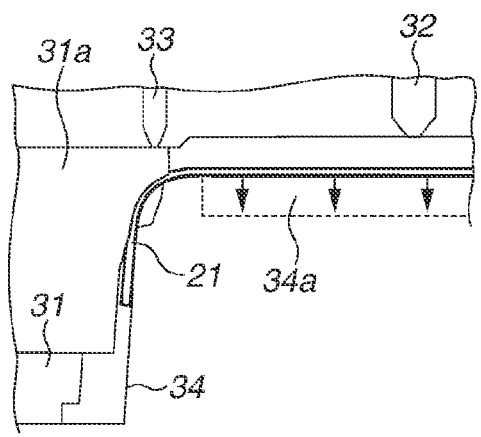
Figure 5C:
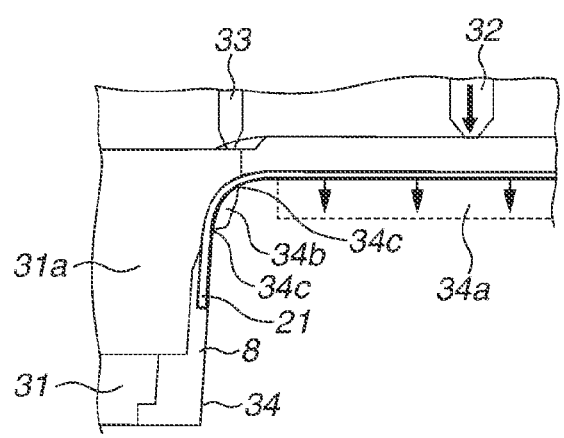

Next, an example of a method for forming the antenna member 21 and the contact member 22 that are integrally formed on the development frame 8 to serve as the conductive path will be described with reference to FIGS. 5A to 7B. FIGS. 5A to 5C are schematic cross-sectional views illustrating a process for forming the antenna member 21 on the development frame 8 through the insert molding. FIGS. 6A, 6B, 7A, and 7B are cross-sectional views illustrating a process for forming the contact member 22 on the development frame 8 through molding.

For forming the antenna member 21 on the development frame 8 through the insert molding, first, the antenna member 21 is set on the side of a protruding mold of a mold for molding the development frame 8, as illustrated in FIG. 5A. The antenna member 21 is sucked by a suction portion 34a provided in the protruding mold 34, to be supported on the protruding mold 34. An area G of the antenna member 21 that is not sucked is in a free state.

Next, the protruding mold 34 is moved in a direction indicated by an arrow Z in FIG. 5A to abut a recessed mold 31, whereby a state in which the mold is closed is caused as illustrated in FIG. 5B. The free area G of the antenna member 21 is then pressed by a part of the recessed mold 31 to have a shape following a curved shape of the protruding mold 34. A part of the antenna member 21 (i.e., part of the curved portion) is sandwiched between the protruding mold 34 and the recessed mold 31 to be fixed in the mold. In other words, the antenna member 21 is interposed between the protruding mold 34 and the recessed mold 31. In this state, it is sufficient that the antenna member 21 be crushed in a thickness direction to such an extent that the antenna member 21 is not displaced.

Next, as illustrated in FIG. 5C, first resin for forming the development frame 8 is injected through a first injection port 32 with the mold closed and the antenna member 21 sucked. As a result, the development frame 8 is molded with the antenna member 21 insert-molded. An area where the antenna member 21 is sandwiched between the protruding mold 34 and the recessed mold 31 is partially provided with a recessed portion 34b recessed toward the protruding mold 34. No resin flows into the recessed portion 34b because it is surrounded by sandwiching portions 34c.

For example, the development frame 8 and the antenna member 21 are preferably made of a material such as compatible materials and a heat bonding material. For example, when the development frame 8 is made of high impact polystyrene (hereinafter, referred to as HIPS), a conductive resin sheet including the PS resin compatible with HIPS, or a conductive resin sheet including the EVA resin having a heat bonding property is preferably used as the antenna member 21.

Figure 6A:
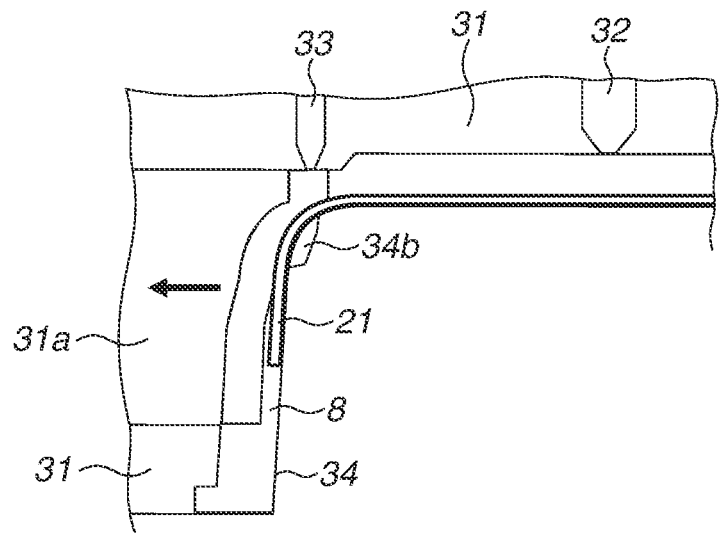
FIGS. 6A and 6B are schematic cross-sectional views illustrating a process for molding a contact member according to the first exemplary embodiment.
Figure 6B:
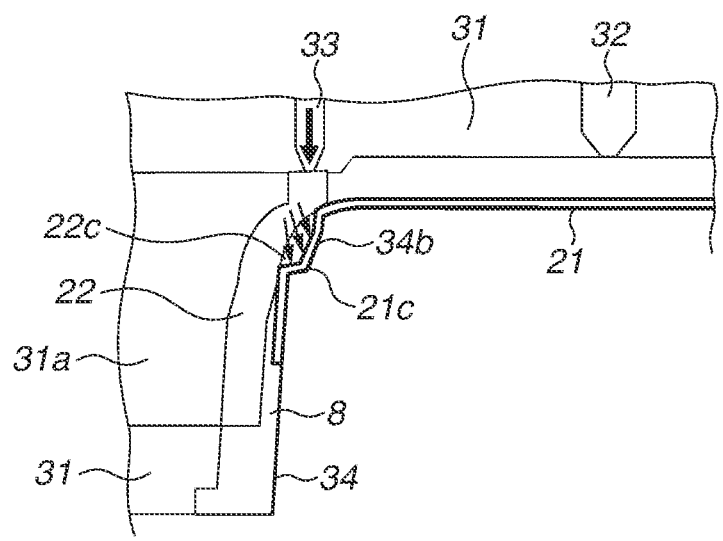

Then, a movable piece 31a constituting a part of the recessed mold 31 is slid by a predetermined amount in a direction (direction indicated by an arrow in FIG. 6A) away from the antenna member 21, as illustrated in FIG. 6A. A space is thereby formed between the movable piece 31a and the development frame 8. The movable piece 31a constitutes a part of the movable recessed mold 31 holding the portion of the antenna member 21 that is exposed from the development frame 8. As illustrated in FIG. 6B, second resin for forming the contact member 22 is injected through a second injection port 33 into the space formed by the movement of the movable piece 31a and molded in the space, whereby the contact member 22 is integrally formed on the development frame 8. Since the antenna member 21 is formed of a flexible resin sheet member, the antenna member 21 at a position facing the recessed portion 34b is deformed to have a shape fitted with the recessed portion 34b upon receiving resin pressure of the second resin. As a result, the protruding portion 22c is formed on the contact member while the engaging portion 21c fitted with the protruding portion 22c is formed on the antenna member 21 in such a manner that the protruding portion 22c engages with the engaging portion 21c. Thus, higher coupling force can be achieved in the contact portion between the contact member 22 and the antenna member 21.

The contact member 22 formed in this manner has a uniform thickness in the sliding direction except for the protruding portion 22c and a gate portion 22e. In the present exemplary embodiment, the space into which the resin is injected is formed using only the movable piece 31a of a single type. However, this should not be construed in a limiting sense. For example, the space may be formed with a combination of a plurality of movable pieces 31a with different sliding amounts, so that the contact member 22 including portions with different thicknesses in the sliding direction can be formed.

The contact member 22 is preferably made of a material compatible with the material of the integrally-molded development frame 8. For example, when HIPS is used for the development frame 8, PS resin or HIPS resin having conductivity due to dispersed carbon and the like is preferably used. The coupling force can be improved by forming the contact member 22 to have a crank shape or a combined shape of different shapes such as a circle and a triangle as illustrated in FIG. 3B, to be more tightly fit with the development frame 8 utilizing the contraction of resin that arises in directions indicated by arrows in FIG. 6B, instead of using compatible materials. Furthermore, the coupling force can be easily improved by providing a recess and a protrusion in the sliding direction as in the contact portion 22f illustrated in FIG. 3C.

Meanwhile, the antenna member 21 is also preferably made of the compatible material. Alternatively, if the conductive resin sheet made of the heat bonding EVA resin is used for the antenna member 21, high coupling force can be ensured between the contact member 22 and the antenna member 21 made of incompatible materials. Furthermore, even if the antenna member 21 does not have the heat bonding property, the coupling force and stable conductivity can be achieved by providing the recess and protrusion at the contact portion between the contact member 22 and the antenna member 21 as described above.

The shapes of the protruding portion 22c and the engaging portion 21c at the contact portion between the contact member 22 and the antenna member 21 are not limited to the square protrusion as illustrated in FIG. 3A, and may be a combination of circular shapes, polygonal shapes, or the like, or may have a plurality of these shapes.

Figure 4:
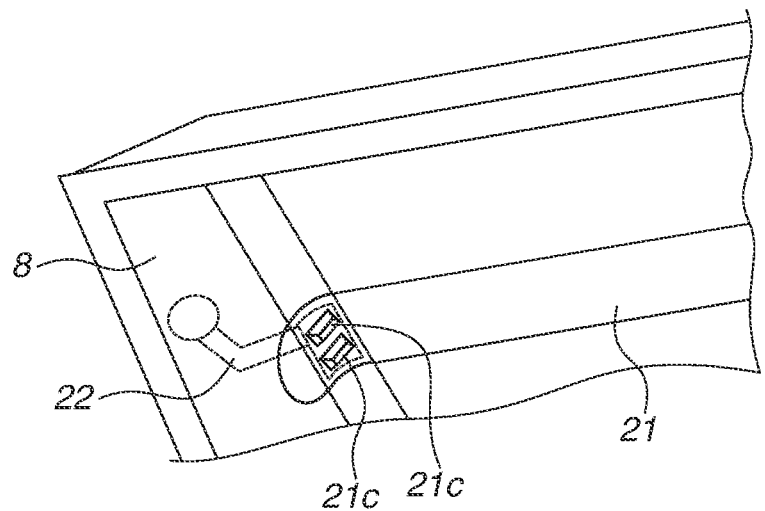
FIG. 4 is a schematic explanatory view illustrating a configuration of the conductive path of the development frame of the developing unit according to the first exemplary embodiment.

For example, FIG. 4 illustrates an example of a configuration where a plurality of protruding portions and a plurality of engaging portions corresponding thereto are formed at the contact portion between the contact member 22 and the antenna member 21. More specifically, as illustrated in FIG. 4, the contact member 22 may include two protruding portions 22c at the contact portion between the contact member 22 and the antenna member 21, and the corresponding antenna member 21 may include two engaging portions 21c that respectively engage with the two protruding portions 22c (FIG. 3C). With this configuration, even higher coupling force can be achieved at the contact portion between the contact member 22 and the antenna member 21. In FIG. 4, the two protruding portions 22c and the two corresponding engaging portions 21c are arranged along the shorter side direction orthogonal to the longitudinal direction of the development frame 8. This further improves the coupling force at the contact portion between the contact member 22 and the antenna member 21.

The numbers, arrangements, and shapes of the protruding portion and the engaging portion can be easily modified by changing the number, arrangement, and shape of the recessed portion 34b of the protruding mold 34. For example, when two protruding portions with a size of several square millimeters (mm) and a depth of approximately 0.1 to 0.3 mm are used for the combination in a case where the EVA resin sheet is used for the antenna member 21 and POM is used for the contact member 22, coupling force that is approximately 1.5 times higher than that in a case without any protruding portion can be achieved.

In the present exemplary embodiment, the description has been given of an example where the flexible antenna member 21 is deformed by the resin pressure at the time of resin molding to improve coupling force. However, this should not be construed in a limiting sense. For example, as illustrated in FIGS. 7A and 7B, a through hole 21d may be formed at a portion of the antenna member 21 that is in contact with the contact member 22. In this case, when the second resin for forming the contact member 22 is injected through the second injection port 33, the injected resin passes through the through hole 21d while deforming the antenna member 21, whereby a penetrating portion 22g is formed. The penetrating portion 22g is thereby formed into an anchor shape relative to the antenna member 21, and higher coupling force between the contact member 22 and the antenna member 21 can be achieved. The contact between the contact member 22 and the antenna member 21 can be achieved not only with the first contacting portion 22a and the first contacted portion 21a, but can also be achieved with a second contacting portion 22b and a second contacted portion 21b that are respectively provided on the opposite side. Thus, more stable conductivity between the members can be achieved. More specifically, the penetrating portion 22g of the contact member 22 comes into contact with one surface of the antenna member 21 and the other surface on the back side of the surface, through the through hole 21d of the antenna member 21, whereby more stable conductivity between the members can be achieved.

Figure 8A:
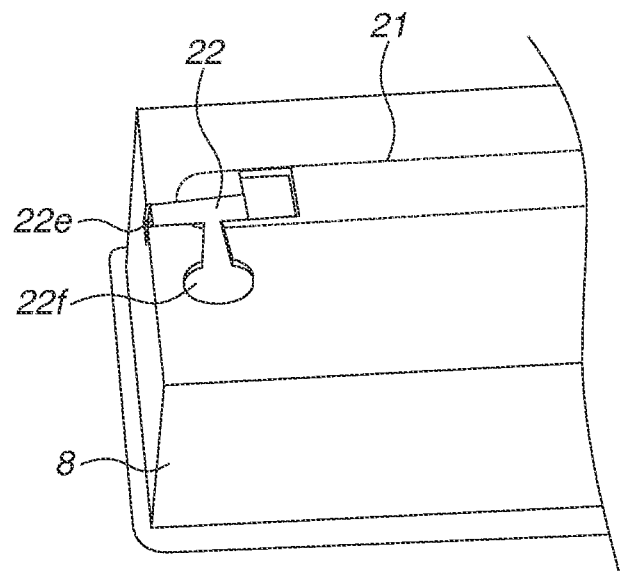
FIGS. 8A and 8B are schematic cross-sectional views illustrating an arrangement example of the contact member and a mold configuration example according to the first exemplary embodiment.

The arrangement of the contact member 22 and the antenna member 21 and the configuration of the mold for forming the contact member 22 described in the present exemplary embodiment are merely an example and thus are not limiting. For example, FIG. 8A illustrates another arrangement example of the contact member 22. As illustrated in FIG. 8A, the contact member 22 may be disposed on a wall surface on the shorter side direction side of the development frame 8. As a configuration example of the mold according to this arrangement example, the movable piece 31a and the second injection port 33 are considered to be arranged as illustrated in FIG. 8B.

Figure 8B:
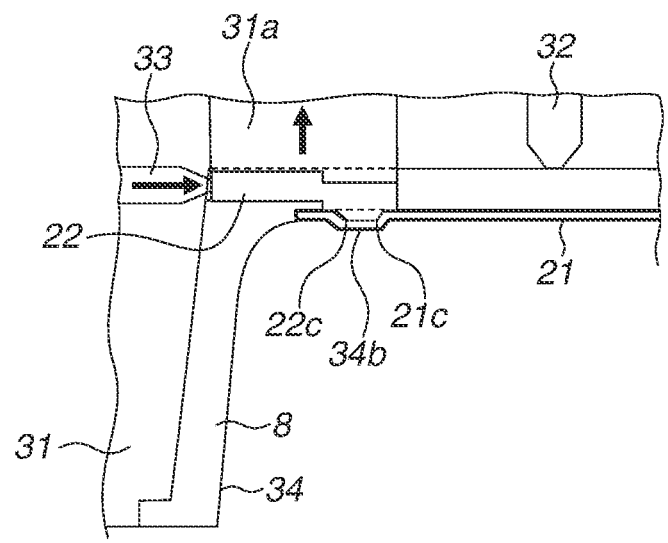

The protruding portion 22c and the penetrating portion 22g, with which the contact member 22 and the antenna member 21 are in contact, may be arranged on a curved surface portion at an end portion in the longitudinal direction of the development frame 8 as illustrated in FIG. 3C, or may be arranged on the wall surface of the development frame 8 on the shorter side direction side as illustrated in FIG. 8B. When a stirring member 17 is configured to slide on an inner wall of the development frame 8 as illustrated in FIG. 2, the protruding portion 22c and the penetrating portion 22g are preferably arranged on the curved surface portion at the end portion in the longitudinal direction as illustrated in FIG. 3C, so that the protruding portion 22c will not interfere with the stirring member 17.

In the present exemplary embodiment, the description has been given of an example where the antenna member 21 is integrally formed on the development frame 8 through the insert molding. However, this should not be construed in a limiting sense, and the antenna member 21 may be fixed onto the development frame 8 with a double-sided tape, a screw, or the like. In the present exemplary embodiment, the double color molding of integrally forming the contact member 22 in the mold for molding the development frame 8 has been described. However, this should not be construed in a limiting sense. For example, the contact member 22 may be formed by causing the mold to abut the development frame 8 on which the antenna member 21 is integrally formed.

As described above, according to the present exemplary embodiment, the configuration of the contact member for electrically connecting between the thin plate-shaped conductive member formed on the development frame, and the image forming apparatus main body can be simplified. This can bring about higher assemblability and lower assembling cost while ensuring stable conductivity.

Figure 9A:
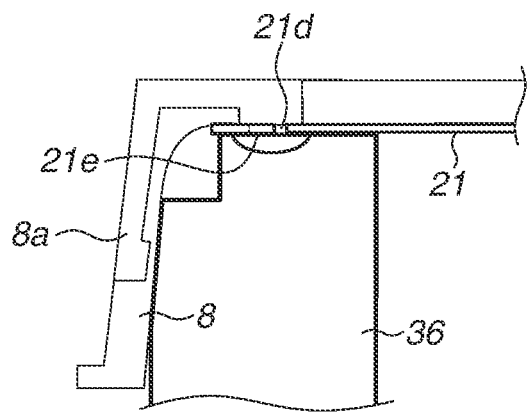
FIGS. 9A, 9B, and 9C are schematic views illustrating an arrangement example of a contact member and a mold configuration example according to a second exemplary embodiment.
Figure 9B:
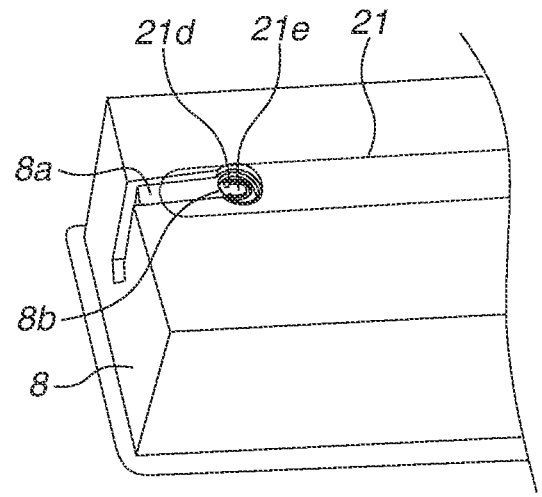
Figure 9C:
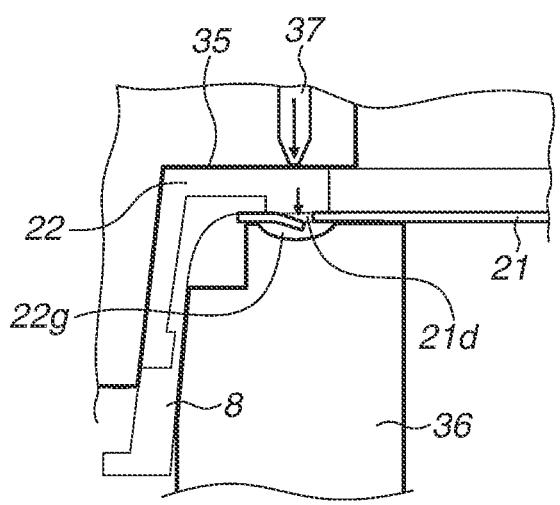

A process cartridge including a developer container according to a second exemplary embodiment, and an image forming apparatus including the process cartridge configured to be detachably attached thereto will be described with reference to FIGS. 9A to 9C. FIGS. 9A to 9C are schematic views illustrating an arrangement example and a molding process of a contact member according to the present exemplary embodiment. FIG. 9A is a schematic cross-sectional view illustrating a state before the contact member 22 is molded. FIG. 9B is a schematic perspective view illustrating the state before the contact member 22 is molded. FIG. 9C is a schematic cross-sectional view illustrating a state after the contact member 22 is molded. The basic configuration is the same as that in the first exemplary embodiment and thus will not be described. Only a configuration unique to the second exemplary embodiment will be described.

In the present exemplary embodiment, the description will be given using an example where a metal plate is used for the antenna member (conductive member) 21 disposed on the inner side of the development frame 8. A method of molding the contact member 22 by causing the mold to abut the development frame 8 and injecting resin will be described as an example of the method of forming the contact member 22 on the development frame 8.

In the present exemplary embodiment, the antenna member 21 made of a metal plate is integrally formed on the development frame 8 provided with a conductive path forming portion 8a for forming the contact member 22. The antenna member 21 may be integrally formed on the development frame 8 through the insert molding as described in the first exemplary embodiment or by being bonded with a double-sided tape. In the present exemplary embodiment, however, the antenna member 21 is fixed on the development frame 8 using the contact member 22 molded on the development frame 8.

First of all, as illustrated in FIG. 9A, the antenna member 21 is disposed on the development frame 8 or a second injection mold 36, and the antenna member 21 is sandwiched between the development frame 8 and the second injection mold 36 to be fixed at the position. A part of the conductive path forming portion 8a of the development frame 8 is provided with a conductive path penetrating portion 8b, and the antenna member 21 is provided with the through hole 21d through which the contact member 22 penetrates. The through hole 21d of the antenna member 21 is arranged to be at least partially overlapped with the conductive path penetrating portion 8b of the development frame 8. The through hole 21d may have a simple circular or polygonal shape, or may have a shape partially provided with a deformed portion 21e as illustrated in FIG. 9B.

Next, as illustrated in FIG. 9C, a first injection mold 35 is caused to abut the development frame 8, so that the development frame 8 is sandwiched between the first injection mold 35 and the second injection mold 36. As a result, the conductive path forming portion 8a of the development frame 8 is surrounded by the first injection mold 35, the second injection mold 36, and the development frame 8. In this state, the second resin serving as the material of the contact member 22 is injected from an injection portion 37 disposed on the first injection mold 35 to be molded, whereby the contact member 22 is formed on the conductive path forming portion 8a. The injected second resin passes through the through hole 21d of the antenna member 21 to form the penetrating portion 22g, so that the antenna member 21 is fastened to the development frame 8 or higher fastening force is achieved.

The through hole 21d of the antenna member 21 is provided with the deformed portion 21e that is deformed by the pressure of the injected resin. Alternatively, higher fastening force may be achieved by providing the deformed portion 21e that is deformed in advance, instead of deforming the deformed portion 21e by the resin pressure.

In the present exemplary embodiment, the description has been given of an example where the antenna member made of the metal plate is used as the conductive member. However, this should not be construed in a limiting sense, and the configuration according to the present invention can be applied to a sheet plate of the developing blade 11 or the like that requires ensuring of the conductive path and fastening to the development frame 8.

As described above, also in the present exemplary embodiment, the configuration of the contact member for electrically connecting between the thin plate-shaped conductive member formed on the development frame, and the image forming apparatus main body can be simplified. This can bring about higher assemblability and lower assembling cost while ensuring stable conductivity.

In the exemplary embodiments described above, the developer container used in the process cartridge including the developing device has been described. However, the present invention is not limited to this. The present invention may be applied to a developer container used in a developing device, a developer container used in an image forming apparatus, or a developer container that stores developer and is configured to be detachably attached to an image forming apparatus. Similar effects can be achieved by applying the present invention to a method for molding a contact member on a frame of these developer containers.

In the exemplary embodiments described above, as an example of a process cartridge configured to be detachably attached to an image forming apparatus main body, the description has been given of the process cartridge that includes, in an integrated manner, the photosensitive drum and the process units that act on the photosensitive, such as the charging unit, a developing unit, and a cleaning unit. However, the present invention is not limited to this, and may be applied to a process cartridge including the photosensitive drum and the developing unit in an integrated manner. Alternatively, the present invention may be applied to a process cartridge including the photosensitive drum and the developing unit, and any one of the charging unit and the cleaning unit, in an integrated manner. Yet alternatively, the present invention may be applied to a developing cartridge (developing device) that does not include the photosensitive drum and supports the developing unit. Yet alternatively, the present invention may be applied to a developer container including no developing unit. Similar effects can be achieved by applying the present invention to a method for molding a contact member on the frame of these components.

In the above exemplary embodiments, the printer has been described as an example of the image forming apparatus. However, the present invention is not limited to this. For example, the present invention may be applied to other image forming apparatuses such as a copier, a facsimile apparatus, and the like, or yet another image forming apparatus such as a multifunction peripheral having the functions of these in combination. Alternatively, the present invention may be applied to an image forming apparatus that includes a recording material bearing member and sequentially transfers toner images of respective colors onto a recording material borne by the recording material bearing member in an overlapping manner. Yet alternatively, the present invention may be applied to an image forming apparatus that uses an intermediate transfer member, sequentially transfers toner images of respective colors onto the intermediate transfer member in an overlapping manner, and collectively transfers the toner images borne by the intermediate transfer member onto a recording material. Similar effects can be achieved by applying the present invention to a developer container used in these image forming apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-032454, filed Feb. 23, 2015, which is hereby incorporated by reference herein in its entirety.

What is claimed is:

1. A developer container comprising:
a frame configured to store developer;
a conductive member provided on the frame; and
a conductive contact member formed of resin, a part of the conductive contact member being exposed from the frame and on an outer side of the frame so as to establish conduction,
wherein the conductive contact member includes a protruding portion that is disposed at a portion to be in contact with the conductive member and protrudes toward the conductive member, and
wherein the conductive member includes an engaging portion that is formed to fit with the protruding portion and configured to engage with the protruding portion.

2. The developer container according to claim 1,
wherein the contact member includes a curved surface portion at a side end portion in a longitudinal direction of the developer container, and
wherein the protruding portion is disposed on the curved surface portion.

3. The developer container according to claim 1,
wherein the contact member includes a plurality of protruding portions, and
wherein the conductive member includes a plurality of engaging portions configured to respectively engage with the plurality of protruding portions.

4. The developer container according to claim 3, wherein the plurality of protruding portions of the contact member and the plurality of engaging portions of the conductive member are arranged in a direction orthogonal to a longitudinal direction of the developer container.

5. The developer container according to claim 1,
wherein the contact member includes a gate portion, and
wherein the contact member has a uniform thickness except for the protruding portion and the gate portion.

6. The developer container according to claim 1, wherein the conductive member is a metal plate or a resin sheet member.

7. The developer container according to claim 1, wherein the conductive member constitutes a developer amount detection unit configured to detect a developer amount using electrostatic capacitance.

8. The developer container according to claim 1, wherein the contact member includes a contact portion provided for electrically connecting to an apparatus main body to which the developer container is attached.

9. A developing device comprising:
the developer container according to claim 1; and
a developer bearing member configured to bear developer,
wherein the developing device is configured to be detachably attached to an apparatus main body of an image forming apparatus.

10. A process cartridge comprising:
the developer container according to claim 1;
a developer bearing member configured to bear developer; and
an image bearing member configured to bear a developer image,
wherein the process cartridge is configured to be detachably attached to an apparatus main body of an image forming apparatus.

11. A developer container comprising:
a frame configured to store developer;
a conductive member provided on the frame; and
a conductive contact member formed of resin on an outer side of the frame so as to be in contact with a part of the conductive member that is exposed from the frame to establish conduction,
wherein the conductive member includes a through hole at a portion to be in contact with the contact member, and
wherein the contact member includes a penetrating portion formed through the through hole.

12. The developer container according to claim 11, wherein the penetrating portion of the contact member is in contact with one surface of the conductive member and another surface on a back side of the one surface, through the through hole of the conductive member.

13. The developer container according to claim 11, wherein the conductive member includes a deformed portion configured to come into contact with the contact member, at a part of the through hole.

14. The developer container according to claim 11,
wherein the contact member includes a gate portion, and
wherein the contact member has a uniform thickness except for the penetrating portion and the gate portion.

15. A method for forming a developer container including:
a frame configured to store developer;
a conductive member provided on the frame; and
a conductive contact member formed of resin on an outer side of the frame so as to be in contact with a part of the conductive member that is exposed from the frame to establish conduction, the method comprising:
a molding step of molding the frame and the contact member by injecting resin between molds sandwiching the conductive member,
wherein the molding step includes:
molding the frame with first resin; and
molding, after molding the frame, the contact member by injecting second resin different from the first resin into a space formed by moving a movable portion of one of the molds that holds the portion of the conductive member that is exposed outward from the frame, away from the conductive member, and
wherein, through the molding step, a protruding portion protruding toward the conductive member is molded at a portion of the contact member that is to be in contact with the conductive member, and an engaging portion configured to engage with the protruding portion is molded by the protruding portion on the conductive member.

16. A method for forming a developer container including:
a frame configured to store developer;
a conductive member provided on the frame; and
a conductive contact member formed of resin on an outer side of the frame so as to be in contact with a part of the conductive member that is exposed from the frame to establish conduction, the method comprising:
a molding step of molding the frame and the contact member by injecting resin between molds sandwiching the conductive member,
wherein the molding step includes:
molding the frame with first resin; and
molding, after molding the frame, the contact member by injecting second resin different from the first resin into a space formed by moving a movable portion of one of the molds that holds the portion of the conductive member that is exposed outward from the frame, away from the conductive member, and
wherein, through the molding step, a penetrating portion is molded at a portion of the contact member that is to be in contact with the conductive member, through a through hole provided at the portion of the conductive member that is exposed from the frame.

17. A method for forming a developing device including:
a developer bearing member configured to supply developer to an image bearing member to develop a developer image;
a frame configured to store developer;
a conductive member provided on the frame; and
a conductive contact member formed of resin on an outer side of the frame so as to be in contact with a part of the conductive member that is exposed from the frame to establish conduction, the method comprising:
a molding step of molding the frame and the contact member by injecting resin between molds sandwiching the conductive member,
wherein the molding step includes:
molding the frame with first resin; and
molding, after molding the frame, the contact member by injecting second resin different from the first resin into a space formed by moving a movable portion of one of the molds that holds the portion of the conductive member that is exposed outward from the frame, away from the conductive member, and
wherein, through the molding step, a protruding portion protruding toward the conductive member is molded at a portion of the contact member that is to be in contact with the conductive member, and an engaging portion configured to engage with the protruding portion is molded by the protruding portion on the conductive member.

18. A method for forming a developing device including:
a developer bearing member configured to supply developer to an image bearing member to develop a developer image;
a frame configured to store developer;
a conductive member provided on the frame; and
a conductive contact member formed of resin on an outer side of the frame so as to be in contact with a part of the conductive member that is exposed from the frame to establish conduction, the method comprising:
a molding step of molding the frame and the contact member by injecting resin between molds sandwiching the conductive member,
wherein the molding step includes:
molding the frame with first resin; and
molding, after molding the frame, the contact member by injecting second resin different from the first resin into a space formed by moving a movable portion of one of the molds that holds the portion of the conductive member that is exposed outward from the frame, away from the conductive member, and
wherein, through the molding step, a penetrating portion is molded at a portion of the contact member that is to be in contact with the conductive member, through a through hole provided at the portion of the conductive member that is exposed from the frame.

19. A method for forming a process cartridge including:
an image bearing member;
a developer bearing member configured to supply developer to the image bearing member to develop a developer image;
a frame configured to store developer;
a conductive member provided on the frame; and
a conductive contact member formed of resin on an outer side of the frame so as to be in contact with a part of the conductive member that is exposed from the frame to establish conduction, the method comprising:
a molding step of molding the frame and the contact member by injecting resin between molds sandwiching the conductive member,
wherein the molding step includes:
molding the frame with first resin; and
molding, after molding the frame, the contact member by injecting second resin different from the first resin into a space formed by moving a movable portion of one of the molds that holds the portion of the conductive member that is exposed outward from the frame, away from the conductive member, and wherein, through the molding step, a protruding portion protruding toward the conductive member is molded at a portion of the contact member that is to be in contact with the conductive member, and an engaging portion configured to engage with the protruding portion is molded by the protruding portion on the conductive member.

20. A method for forming a process cartridge including:

an image bearing member;

a developer bearing member configured to supply developer to the image bearing member to develop a developer image;

a frame configured to store developer;

a conductive member provided on the frame; and a conductive contact member formed of resin on an outer side of the frame so as to be in contact with a part of the conductive member that is exposed from the frame to establish conduction, the method comprising:

a molding step of molding the frame and the contact member by injecting resin between molds sandwiching the conductive member, wherein the molding step includes:

molding the frame with first resin; and molding, after molding the frame, the contact member by injecting second resin different from the first resin into a space formed by moving a movable portion of one of the molds that holds the portion of the conductive member that is exposed outward from the frame, away from the conductive member, and wherein, through the molding step, a penetrating portion is molded at a portion of the contact member that is to be in contact with the conductive member, through a through hole provided at the portion of the conductive member that is exposed from the frame.

* * * * *